(12) United States Patent
Savoor et al.

(10) Patent No.: US 10,951,938 B2
(45) Date of Patent: *Mar. 16, 2021

(54) METHOD AND SYSTEM FOR PROVIDING CONTENT

(71) Applicant: AT&T Intellectual Property I, L.P., Atlanta, GA (US)

(72) Inventors: Raghvendra Savoor, Walnut Creek, CA (US); Zhi Li, San Ramon, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 58 days.

This patent is subject to a terminal disclaimer.

(21) Appl. No.: 16/379,217

(22) Filed: Apr. 9, 2019

(65) Prior Publication Data

US 2019/0238915 A1 Aug. 1, 2019

Related U.S. Application Data

(60) Continuation of application No. 14/700,637, filed on Apr. 30, 2015, now Pat. No. 10,298,988, which is a
(Continued)

(51) Int. Cl.
| | |
|---|---|
| *H04N 21/2347* | (2011.01) |
| *H04N 21/4405* | (2011.01) |
| *H04N 21/2668* | (2011.01) |
| *H04N 21/462* | (2011.01) |
| *H04N 21/458* | (2011.01) |
| *H04N 21/475* | (2011.01) |
| *H04N 21/482* | (2011.01) |
| *H04N 21/8355* | (2011.01) |

(Continued)

(52) U.S. Cl.
CPC ....... *H04N 21/2668* (2013.01); *H04N 7/1675* (2013.01); *H04N 21/2187* (2013.01); *H04N 21/2347* (2013.01); *H04N 21/4405* (2013.01); *H04N 21/458* (2013.01); *H04N 21/4622* (2013.01); *H04N 21/4755* (2013.01); *H04N 21/482* (2013.01); *H04N 21/8355* (2013.01); *H04N 21/854* (2013.01)

(58) Field of Classification Search
CPC .......... H04N 21/2347; H04N 21/2668; H04N 21/4405; H04N 21/4622; H04N 21/4755; H04N 21/458; H04N 21/2187; H04N 21/482; H04N 21/8355; H04N 21/854; H04N 7/1675
See application file for complete search history.

(56) References Cited

U.S. PATENT DOCUMENTS

| | | |
|---|---|---|
| 5,734,720 A | 3/1998 | Salganicoff et al. |
| 6,591,420 B1 | 7/2003 | McPherson et al. |
| (Continued) | | |

FOREIGN PATENT DOCUMENTS

WO 2007072368 A1 6/2007

*Primary Examiner* — Pinkal R Chokshi
(74) *Attorney, Agent, or Firm* — Guntin & Gust, PLC; Robert Gingher

(57) ABSTRACT

Methods and systems for providing content. A selection of a single virtual channel may be received from the user. Virtual programming data for the single virtual channel may be accessed. The virtual programming data may define content to be provided over the single virtual channel. The content may be provided over the single virtual channel in accordance with the virtual programming data.

20 Claims, 17 Drawing Sheets

Related U.S. Application Data division of application No. 11/844,720, filed on Aug. 24, 2007, now Pat. No. 9,049,344.

(51) Int. Cl.
*H04N 7/167* (2011.01)
*H04N 21/2187* (2011.01)
*H04N 21/854* (2011.01)

(56) References Cited

U.S. PATENT DOCUMENTS

| | | | |
|---|---|---|---|
| 6,694,316 B1 | 2/2004 | Langseth et al. | |
| 6,963,898 B2 | 11/2005 | Yoshimine et al. | |
| 7,146,627 B1 | 12/2006 | Ismail et al. | |
| 7,149,309 B1 | 12/2006 | Silver et al. | |
| 7,149,509 B2 | 12/2006 | Shanahan | |
| 7,853,600 B2 | 12/2010 | Herz et al. | |
| 2001/0013123 A1 | 8/2001 | Freeman et al. | |
| 2002/0157092 A1* | 10/2002 | Kitsukawa | H04H 60/40 725/9 |
| 2003/0126600 A1* | 7/2003 | Heuvelman | H04N 5/44543 725/35 |
| 2003/0154479 A1 | 8/2003 | Brenner et al. | |
| 2004/0052377 A1 | 3/2004 | Mattox et al. | |
| 2004/0103444 A1 | 5/2004 | Weinberg et al. | |
| 2004/0140995 A1 | 7/2004 | Goldthwaite et al. | |
| 2004/0221303 A1 | 11/2004 | Sie et al. | |
| 2004/0254851 A1 | 12/2004 | Himeno et al. | |
| 2004/0268403 A1 | 12/2004 | Krieger et al. | |
| 2005/0091680 A1* | 4/2005 | Kondo | H04N 7/163 725/12 |
| 2005/0251842 A1 | 11/2005 | Benliyan | |
| 2006/0123455 A1 | 6/2006 | Pai et al. | |
| 2007/0083901 A1 | 4/2007 | Bond | |
| 2007/0093239 A1* | 4/2007 | Camp, Jr. | H04L 29/06027 455/418 |
| 2007/0101380 A1* | 5/2007 | Szolyga | H04N 21/4135 725/100 |
| 2007/0124779 A1 | 5/2007 | Casey et al. | |
| 2007/0157281 A1 | 7/2007 | Ellis et al. | |
| 2007/0199015 A1 | 8/2007 | Lopez et al. | |
| 2008/0092181 A1 | 4/2008 | Britt | |
| 2008/0229373 A1 | 9/2008 | Ma et al. | |
| 2008/0301736 A1 | 12/2008 | Heilbron et al. | |

* cited by examiner

METHOD AND SYSTEM FOR PROVIDING CONTENT

CROSS-REFERENCE TO RELATED APPLICATIONS

This is a continuation of application of U.S. application Ser. No. 14/700,637, filed Apr. 30, 2015 which is a divisional of U.S. application Ser. No. 11/844,720, filed Aug. 24, 2007 (now U.S. Pat. No. 9,049,344), which are incorporated herein by reference in their entirety.

FIELD OF THE DISCLOSURE

This application relates to a method and system for data signaling, and more specifically to methods and systems for providing content.

BACKGROUND OF THE DISCLOSURE

Users may select a number of different television channels at various times to view content (e.g., television shows or movies) on a display device. Not all of the content may be available through a real-time broadcast from a content source. Rather, the content may need to be downloaded from a content source prior to viewing. The users may be inconvenienced by selecting different channels and downloading content from a variety of sources when attempting to view content during a viewing session.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF THE DRAWINGS

Example methods and systems for providing content are described. In the following description, for purposes of explanation, numerous specific details are set forth in order to provide a thorough understanding of example embodiments. It will be evident, however, to one skilled in the art that the present invention may be practiced without these specific details.

In an example embodiment, a content selection may be received from a user from a plurality of content sources. Virtual programming data may be composed for a single virtual channel from the content selection. Content of the content selection may be provided over the single virtual channel in accordance with the virtual programming data.

In an example embodiment, a selection of a single virtual channel may be received from the user. Virtual programming data for the single virtual channel may be accessed. The virtual programming data may define content to be provided over the single virtual channel. The content may be provided over the single virtual channel in accordance with the virtual programming data.

In an example embodiment, a viewing profile may be accessed. Content may be selected for a virtual programming data from available programming data of a plurality of content sources in accordance with the viewing profile. The virtual programming data may be composed for a single virtual channel from the selection of the content in accordance with the viewing profile. The content may be provided over the single channel in accordance with the virtual programming data.

In an example embodiment, available programming data may be received from a number of content sources. Virtual programming data may be composed for a single virtual channel from the available programming data of the plurality of content sources. Virtual channel subscription data may be accessed for the virtual programming data. The virtual channel subscription data may include identification of one or more receiver devices. The virtual programming data may be provided to the one or more receiver devices. The one or more receiver devices may be capable of presenting the content from the plurality of content sources over a single virtual channel in accordance with the virtual programming data.

Figure 1:
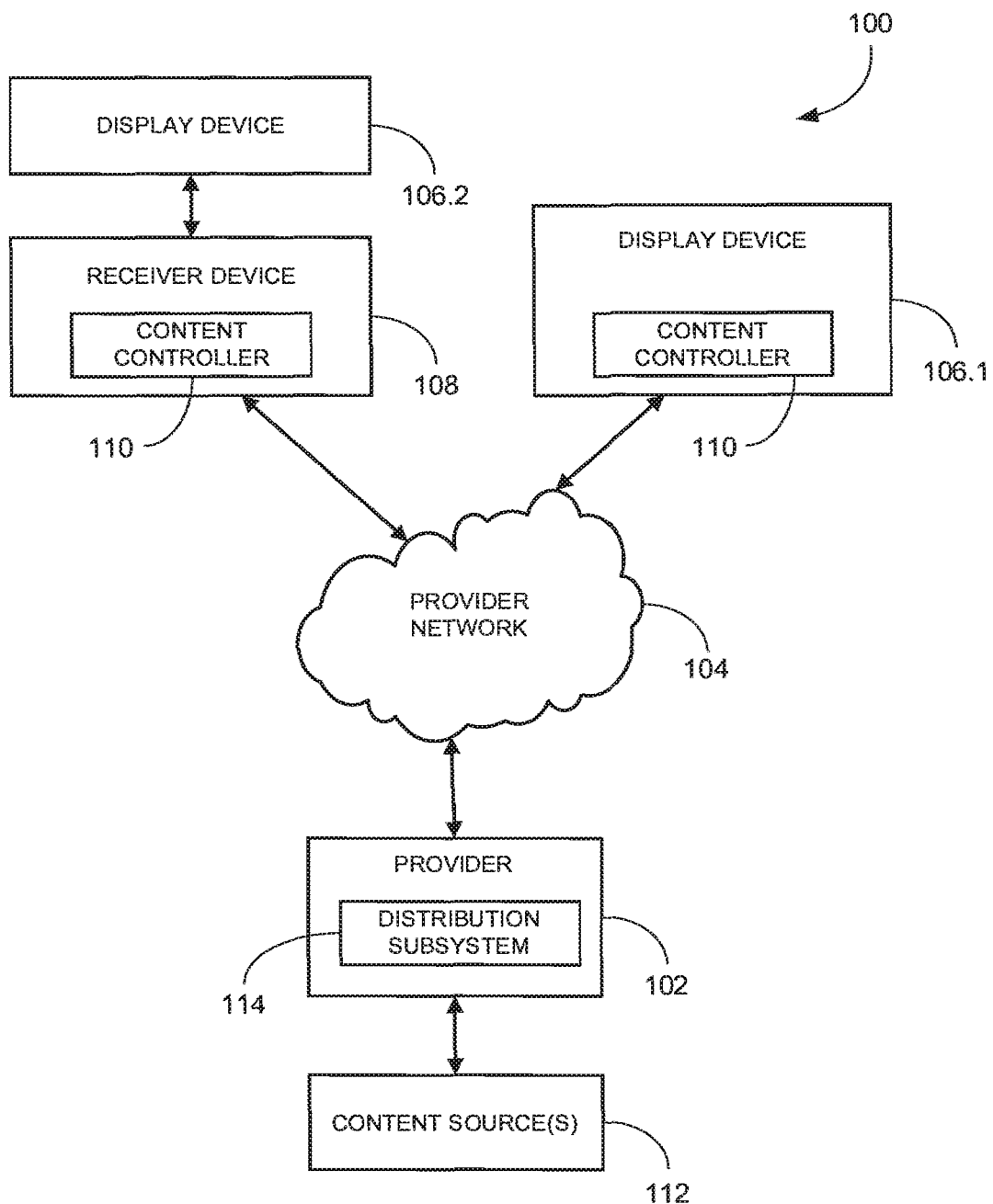
FIG. 1 is a block diagram of an example content system according to an example embodiment.

FIG. 1 illustrates an example content system 100. The content system 100 includes a provider 102 that may provide a video signal having content over a provider network 104 to a display device 106.1 and/or to a display device 106.2 through a receiver device 108. The content may include television content, video-on-demand (VOD) content, gaming content, remote desktop protocol content, and/or Internet data content. Other types of content may also be provided.

The video signal may be a sequence of images and one or more associated audio tracks. The video signal may be a high quality video stream (e.g., MPEG-4) that is transcoded for distribution to the display device 106.1 and/or the receiver device 108. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies, and commercials.

The provider 102 may be a television station, a broadcast network, a server, or the like. The provider 102 may have available programming data (e.g., one or more available programming lists) of content available from one or more content sources 112. The available programming data may define the content available from a particular content source (e.g., a channel of television content).

Available programming data (e.g., an available programming list) may, for example, define start times, end times, content length, and an order of the content to be presented on a broadcast channel. For example, the programming data of a NBC station may include all of the television shows available for one or more days. The available programming data may be used by an electronic program guide (EPG) to present to a user available content on a particular channel.

Other types of programming data may be available from content sources. The other programming data may be organized by categories, authors, creators, keywords, tags, and the like. For example, the content available at a particular website (e.g., Break.com) may be organized into categories including "Animal Videos", "Animation", "Auto Videos", "Celebs", "Entertainment", "Funny Videos", "How-to", "Illusion", "Military Videos", "Movie Trailers", "News Videos", "Photos", "Sports Videos", "TV Videos", and "Video Games".

The provider 102 may include a distribution subsystem to provide virtual programming data and/or content to the receiver device 108 and/or the display devices 106.1, 106.2. The virtual programming data may define content to be provided over a single virtual channel from the content sources 112. The virtual programming data may be derived from actual programming data. The virtual programming data may, by way of an example include a content start time, a content end time, a content length, an associated content source, and an order of the content to be presented on a single virtual channel. The virtual programming data may be used by an EPG to present to a user available content on the virtual channel.

The provider network 104 may be a television distribution network, Global System for Mobile Communications (GSM) network, an Internet Protocol (IP) network, a Wireless Application Protocol (WAP) network, and/or a Wifi network. Other networks may also be used.

The display device 106.1, 106.2, may be a television monitor, a mobile telephone, a portable gaming device, a personal digital assistant (PDA), a computer monitor, and the like. Other types of display devices may also be used.

A content controller 110 may be embodied within the display device 106.1 and/or the receiver device 108 to enable presentation of content through one or more virtual channels. Examples of the receiver device 108 include a set-top box (STB), a receiver card, a mobile telephone, a PDA, and a computing system; however other devices may also be used. An example embodiment of the content controller 110 is described in greater detail below.

The receiver device 108 and/or the display devices 106.1, 106.2, may be capable of presenting the content from the content sources 112 over a virtual channel in accordance with virtual programming data. The content sources 112 may include a content provider, a remote desktop protocol (RDP) source, an Internet source, and the like.

Figure 2:
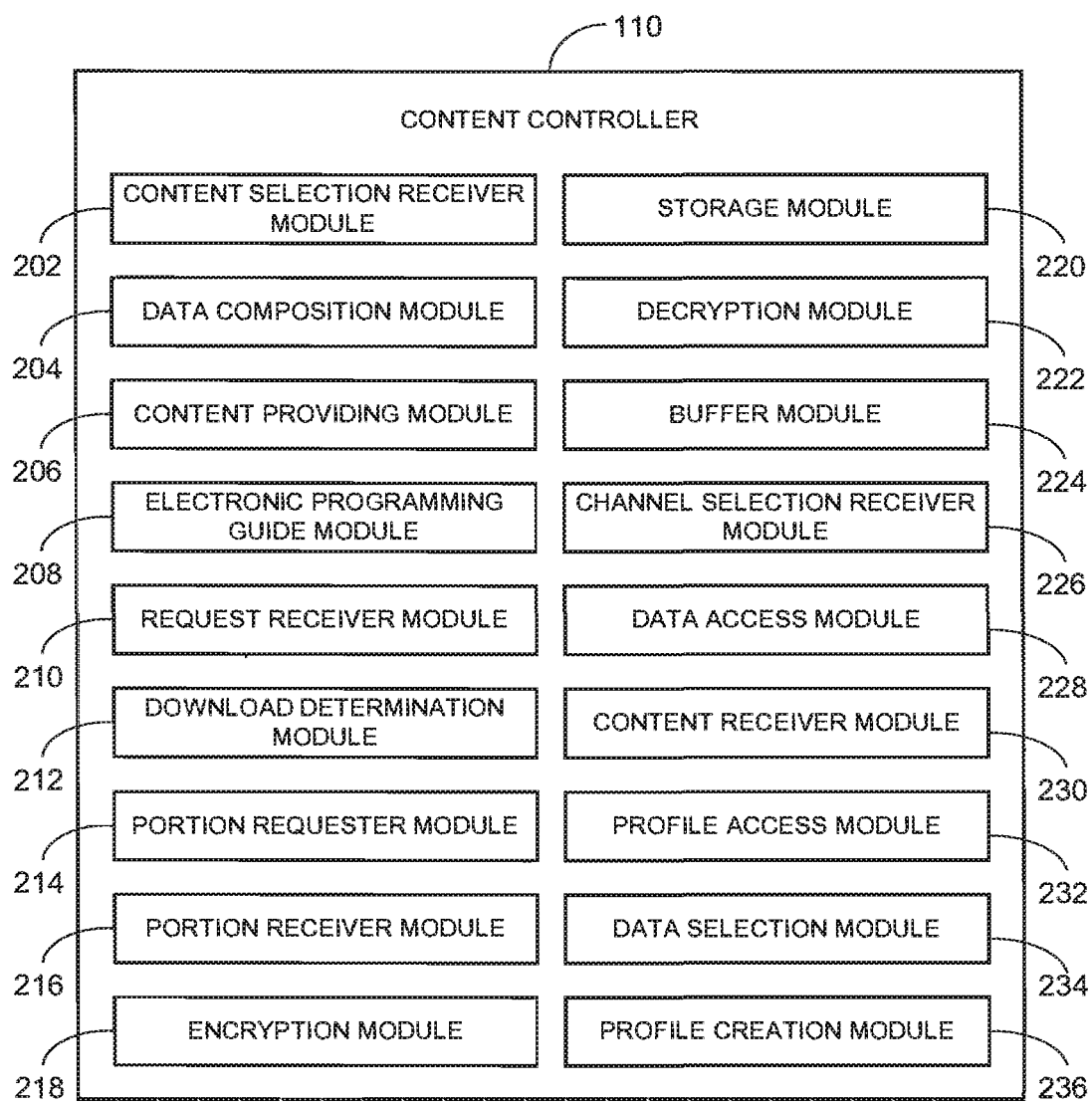
FIG. 2 is a block diagram of an example content controller that may be deployed in the content system of FIG. 1 according to an example embodiment.

FIG. 2 illustrates an example content controller 110 that may be deployed in the content system 100 (see FIG. 1) and/or another system.

The content controller 110 may include a content selection receiver module 202, a data composition module 204, a content providing module 206, an electronic program guide (EPG) module 208, a request receiver module 210, a download determination module 212, a portion requestor module 214, a portion receiver module 216, an encryption module 218, a storage module 220, a decryption module 222, a buffer module 224, a channel selection receiver module 226, a data access module 228, a content receiver module 230, a profile access module 232, a data selection module 234, and/or a profile creation module 236. Other modules may also be used.

The content selection receiver module 202 receives, from a user, a content selection from the content sources 112. The content selection may be received from the EPG, remotely received (e.g., from a user interface on a web page), or otherwise received.

The data composition module 204 composes virtual programming data for a single virtual channel from the content selection. The content providing module 206 provides content (e.g., one or more portions) of the content of the content selection over the single virtual channel in accordance with the virtual programming data.

The EPG module 208 presents an EPG to the user and/or adds the single virtual channel to the EPG. The request receiver module 210 receives a request for the single virtual channel.

The download determination module 212 determines whether a portion of the content is available for download from a selected content source of the content sources 112 prior to viewing. The portion requester module 214 requests the portion of the content based on the determination made by the download determination module 212. The portion receiver module 216 receives the requested portion of the content from the selected content source. The portion may be received in real-time or otherwise received.

The encryption module 218 encrypts the received portion of the content. The encrypted content portion may include a viewing restriction until a designated time. The designated time may indicate when the content may be viewed. The storage module 220 stores a content portion (e.g., an encrypted content portion). The decryption module 222 decrypts the encrypted content portion (e.g., in accordance with the designated time).

The buffer module 224 buffers a portion of the content received. The channel selection receiver module 226 receives a selection of a single virtual channel from the user. The data access module 228 accesses virtual programming data for the single virtual channel. The virtual programming data may define content to be provided over a single virtual channel.

The content receiver module 230 receives the content from the content sources 112 over the provider network 104. The profile access module 232 accesses a viewing profile. The data selection module 234 selects, in accordance with the viewing profile, content for virtual programming data from available programming data of the content sources 112. The profile creation module 236 creates a viewing profile based on tracking of prior content received from the content sources 112.

Figure 3:
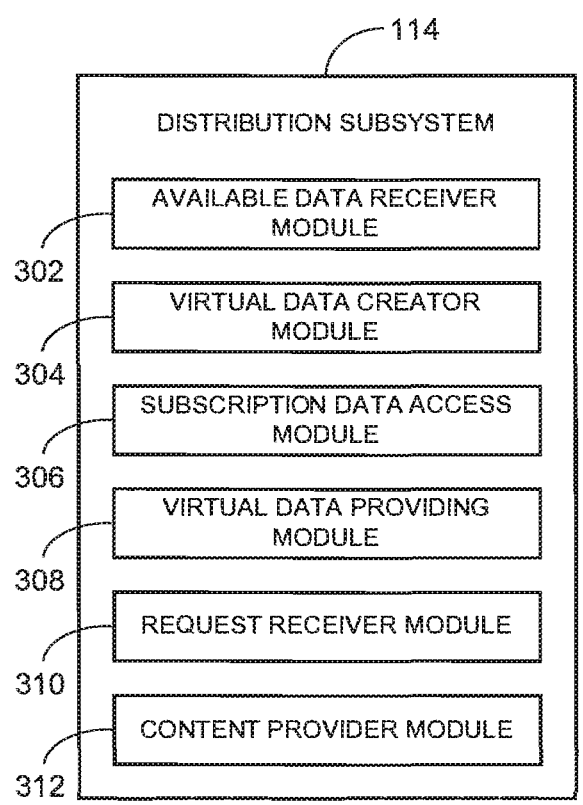
FIG. 3 is a block diagram of an example distribution subsystem that may be deployed in the content system of FIG. 1 according to an example embodiment.

FIG. 3 illustrates an example distribution subsystem 114 that may be deployed in the content system 100 (see FIG. 1) and/or another system.

The distribution subsystem 114 may include an available data receiver module 302, a virtual data creator module 304, a subscription data access module 306, a virtual data providing module 308, a request receiver module 310, and/or a content provider module 312. Other modules may also be used.

The available data receiver module 302 receives available programming data from the content sources 112. The virtual data creator module 304 composes virtual programming data for a single virtual channel from the available programming data of the content sources 112.

The subscription data access module 306 accesses virtual channel subscription data for the virtual programming data. The virtual channel subscription data may include identification of the one or more receiver devices 108 and/or the one or more display devices 106.1.

The virtual data providing module 308 provides the virtual programming data to the one or more receiver devices 108 and/or the one or more display devices 106.1 in accordance with the virtual channel subscription data.

The request receiver module 310 receives a request for content from the content sources 112 in accordance with the virtual programming data. The content provider module 312 provides the content in response to the request.

Figure 4:
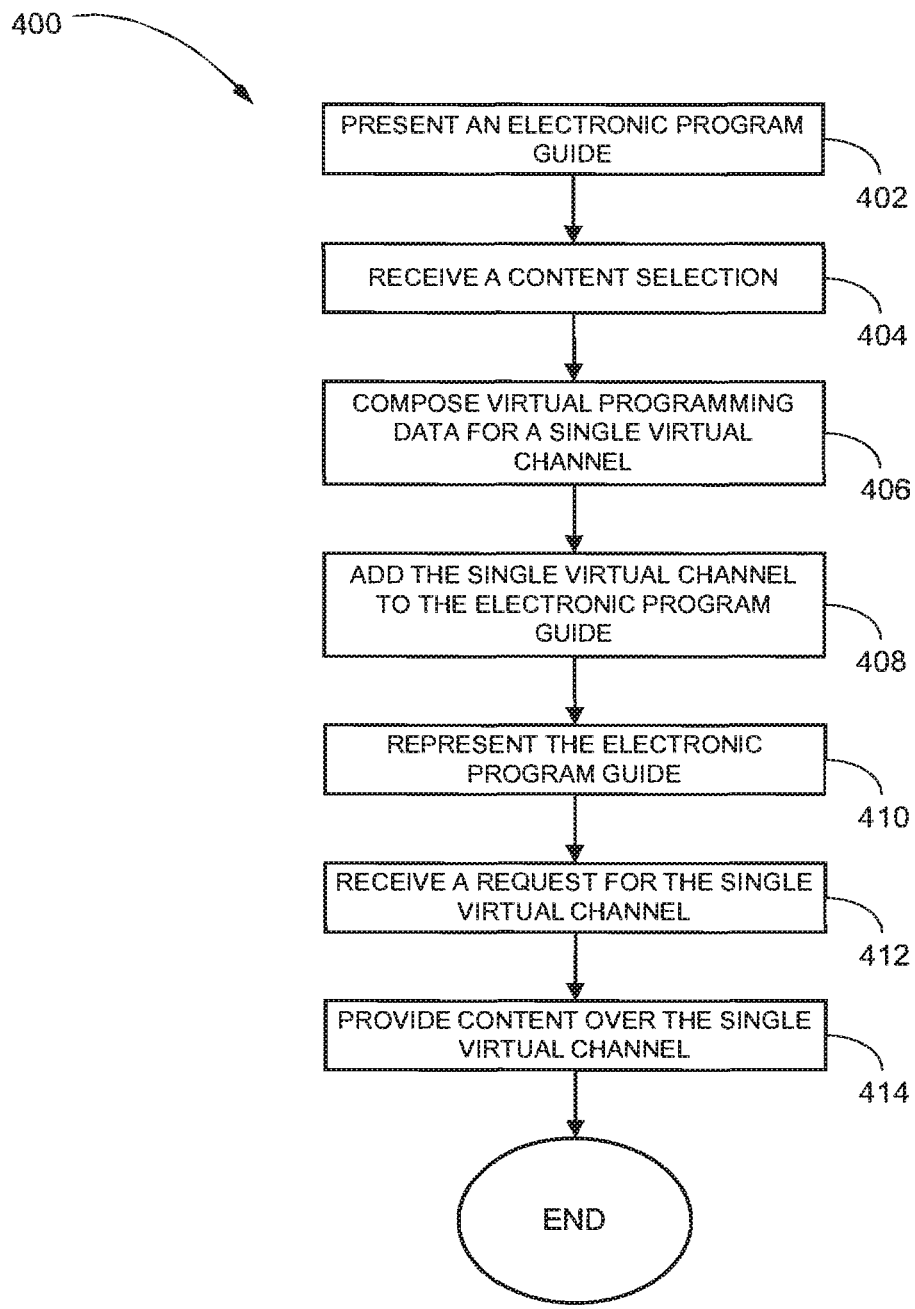
FIGS. 4 and 5 are example user interfaces that may be provided on a display device of the content system of FIG. 1 according to an example embodiment.

FIG. 4 illustrates a method 400 for creating a single virtual channel according to an example embodiment. The method 400 may be performed by the content controller 110 of the content system 100 or otherwise performed.

A single virtual channel may be created to enable viewing of programming from a variety of content sources 112 without changing a channel selection to receive the content from a difference content source 112. For example, one or more users of a single display device 106.1, 106.2 may receive a single virtual channel specifically for that single display device, (e.g., a family-friendly virtual channel may be created for the television in a family room of a house), a single virtual channel may be created for a single user for multiple display devices 106.1, 106.2 (e.g., for a family member for any room in a house), or the single virtual channel may be otherwise created. By way of an example, a first single virtual channel may be created for a main television in a house and a second single virtual channel may be created for the children of the same house.

Content may be presented contiguously on the single virtual channel without requiring a user to change channels to view desired content. The use of the single virtual channel may increase viewership of content, increase a user's satisfaction in receiving content, and/or prevent users from missing content that the user would otherwise watch.

An EPG may be presented to the user at block 402. The EPG may include information on scheduled broadcast television programs and may allow a viewer to navigate, select, and discover content by time, title, channel, and/or genre.

A content selection from the content sources 112 is received from a user at block 404. During the operations at block 404, the user may designate content to be included in the virtual channel by making the content selection. The content selection may be received from the user on the EPG, through a user interface on a computing system, or otherwise received.

The content selection may be received from the user in a designated order to select the order in which the user wishes to receive the content. The designated order may be based on time, preference, or other criterion.

Virtual programming data is composed for a single virtual channel from the content selection at block 406. The virtual programming data may include selected content for a particular user, or a particular receiver device 108, and/or a particular display device 106.1, 106.2. The virtual programming data may define the order that the selected content is to be presented on a single virtual channel from the content sources 112.

The single virtual channel may be added to the EPG at block 408. Adding the single virtual channel to the EPG may enable a user to easily select the single virtual channel from among other real and virtual channels. The EPG may be represented to the user with the added single virtual channel at block 410. A request for the single virtual channel may be received at block 412.

The content of the content selection is provided over the single virtual channel in accordance with the virtual programming data at block 414. The user may view the content defined on the virtual programming data through the single virtual channel without changing channels on the display devices 106.1, 106.2 and/or the receiver device 108. Example embodiments of providing the content over the single virtual channel is described in greater detail below.

Figure 5:
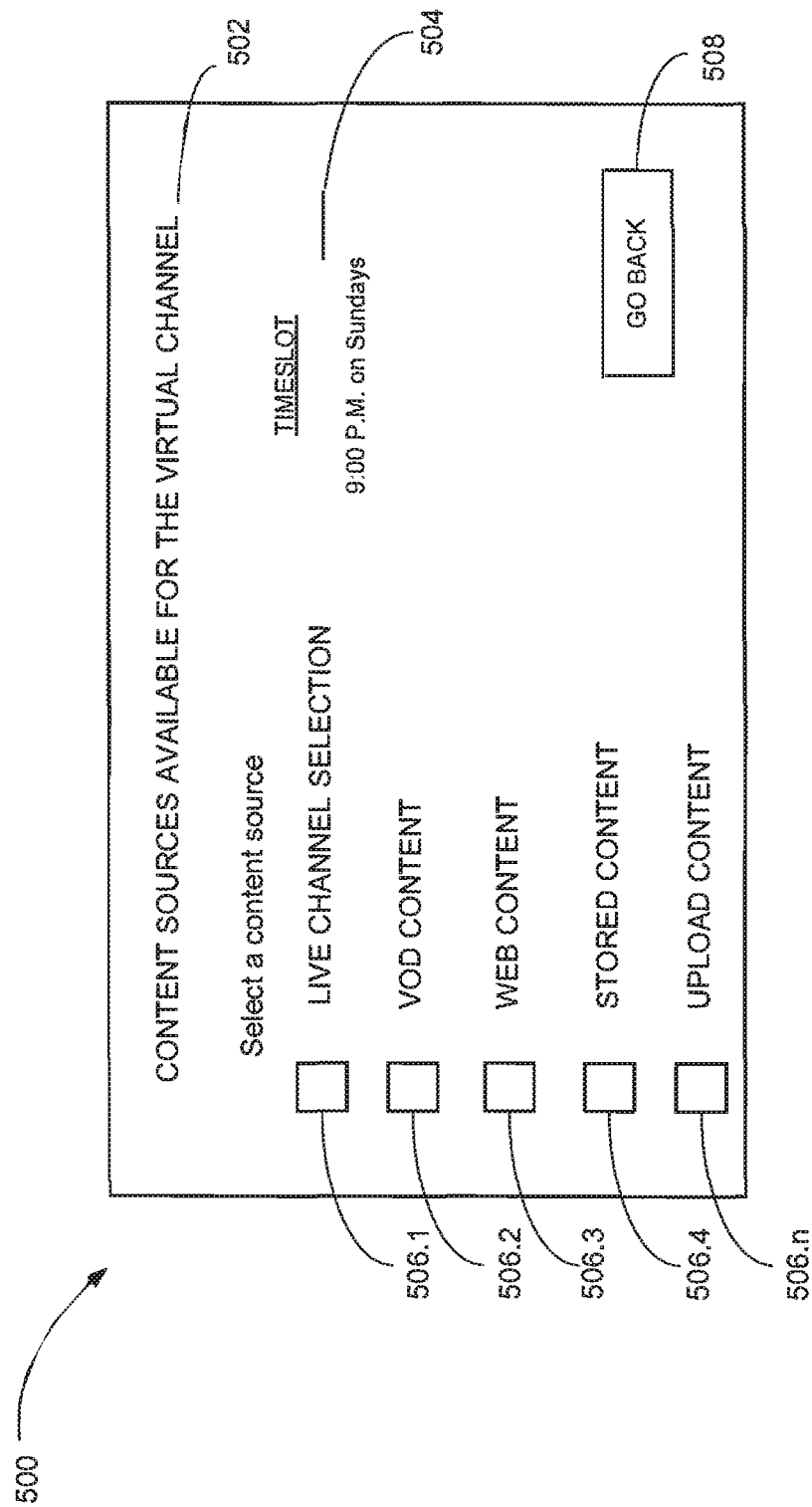

FIG. 5 illustrates an example user interface 500 that may be provided on a display of the display device 106.1, 106.2 in the content system 100 or otherwise provided.

The user interface 500 may be provided to a user when attempting to select a content source for a virtual channel. A page identifier 502 may indicate to the user that a number of content sources 506.1-506.$n$ are available for selection for a timeslot 502. The user may select one of the content sources 506.1-506.$n$ or may make a go back selection 508 to return to a previous user interface.

Figure 6:
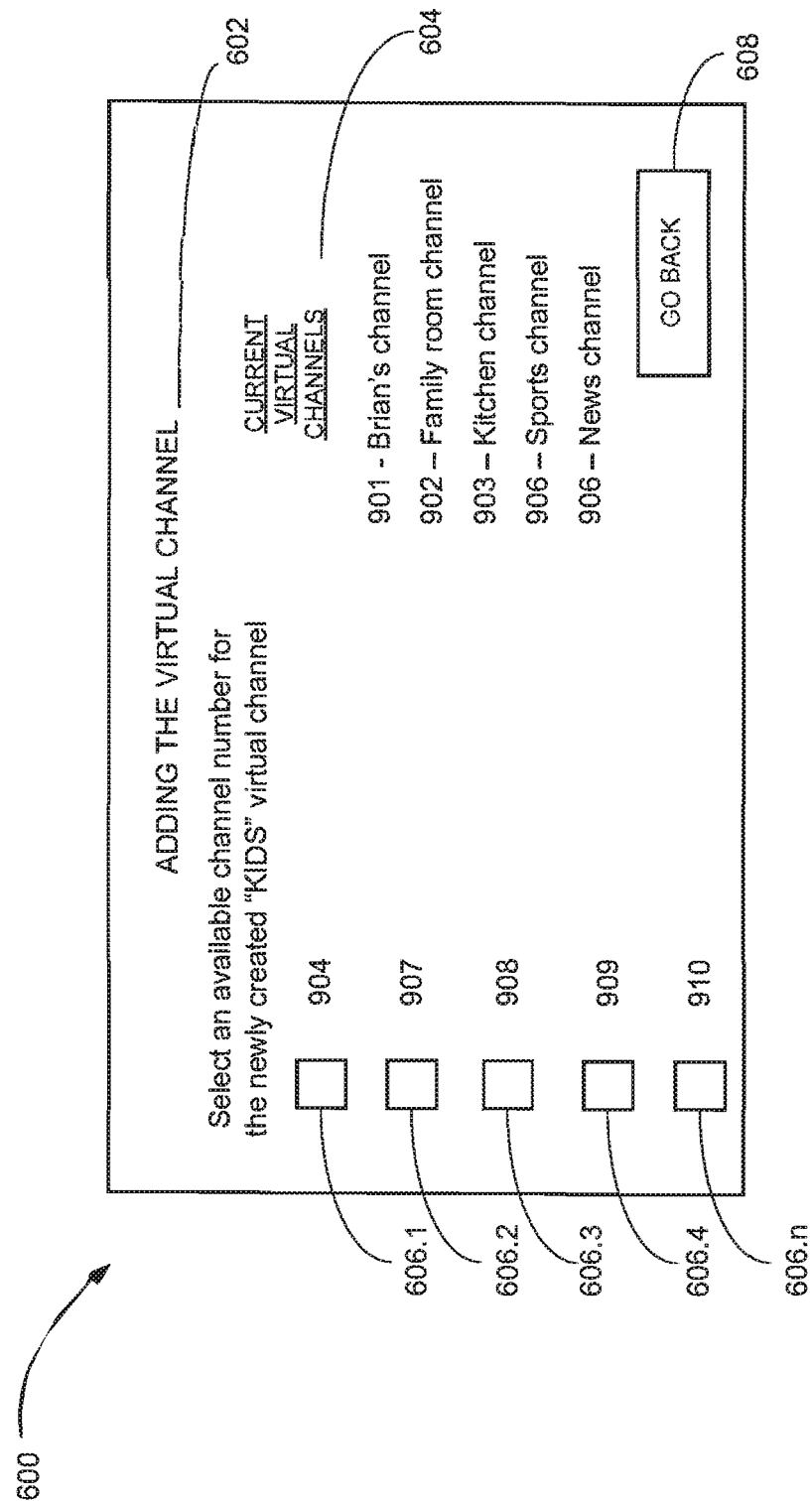
FIG. 6 is a flowchart illustrating a method for creating a single virtual channel in accordance with an example embodiment.

FIG. 6 illustrates an example user interface 500 that may be provided on a display of the display device 106.1, 106.2 in the content system 100 or otherwise provided.

The user interface 600 may be provided to a user when attempting to add a virtual channel to an EPG. A page identifier 602 may indicate to the user that a number of available channel numbers 606.1-606.$n$ are available for selection to a virtual channel list. The user may select one of the channel numbers 606.1-606.$n$ or my make a go back selection 608 to return to a previous user interface.

Figure 7:
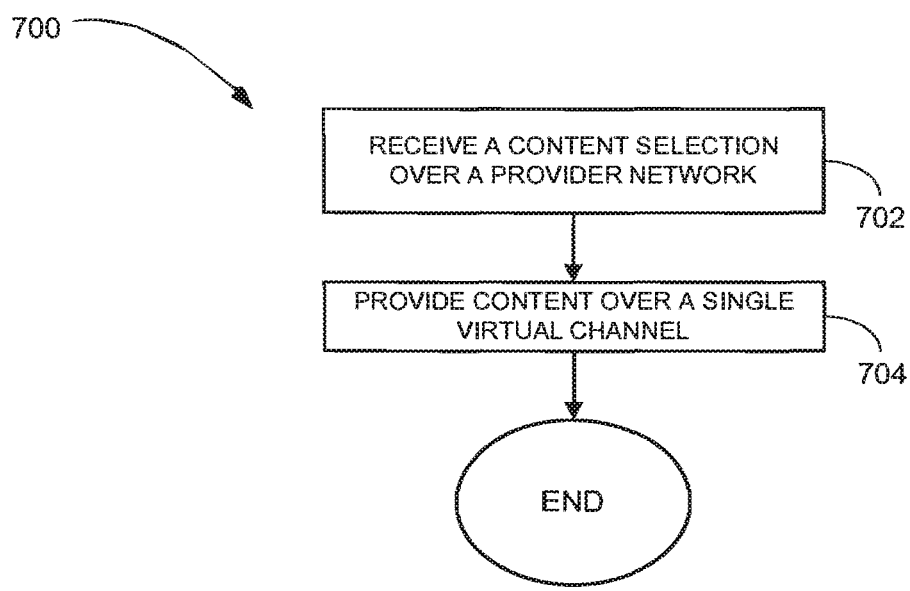
FIGS. 7-12 are flowcharts illustrating a method for providing content over a single virtual channel in accordance with an example embodiment.

FIG. 7 illustrates a method 700 for providing content over a single virtual channel according to an example embodiment. The method 700 may be performed at block 414 (see FIG. 4) or otherwise performed.

Content of a content selection is received from the content sources 112 over the provider network 104 (e.g., an Internet Protocol (IP) network) at block 702. The content of the content selection is provided over the single virtual channel in accordance with the virtual programming data at block 704.

Figure 8:
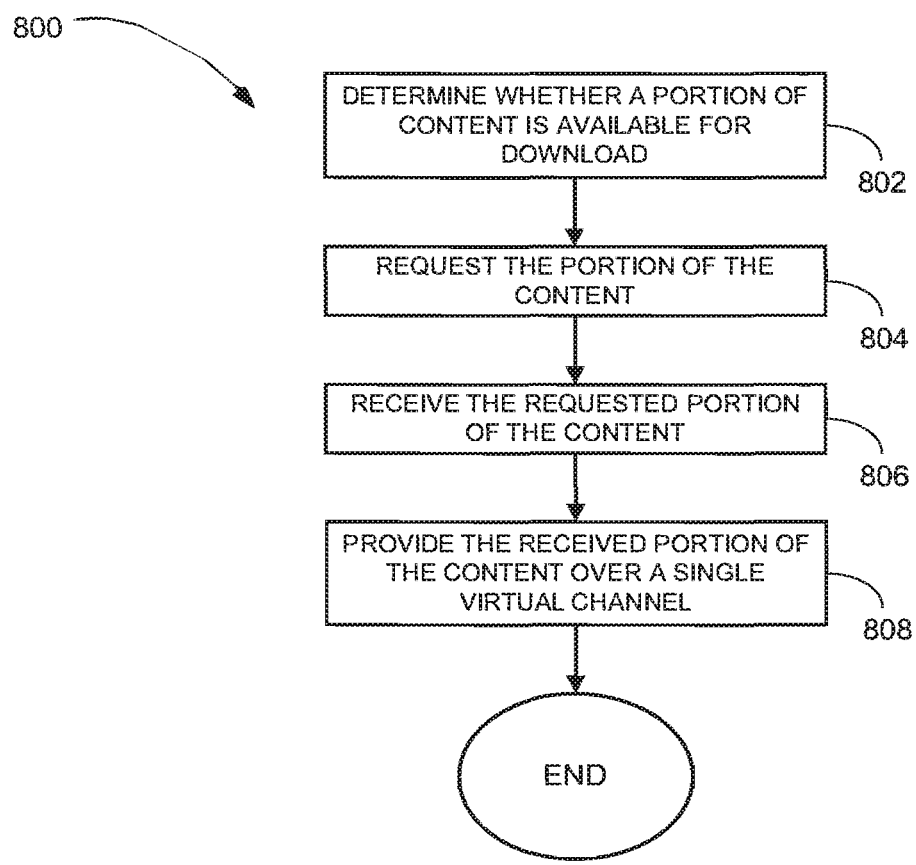

FIG. 8 illustrates a method 800 for providing content over a single virtual channel according to an example embodiment. The method 800 may be performed at block 414 (see FIG. 4) or otherwise performed.

At block 802, a determination is made of whether a portion of the content is available for download from a selected content source of the content sources 112 prior to viewing. The determination may be made when content is known to be available from a particular content source, if an inquiry to a content source reveals that content is available, or may be otherwise made. The portion of the content is requested based on the results of the determination at block 804. The requested portion of the content is received from the selected content source at block 806. The received portion of the content is provided over the single virtual channel in accordance with the virtual programming data at block 808.

Figure 9:
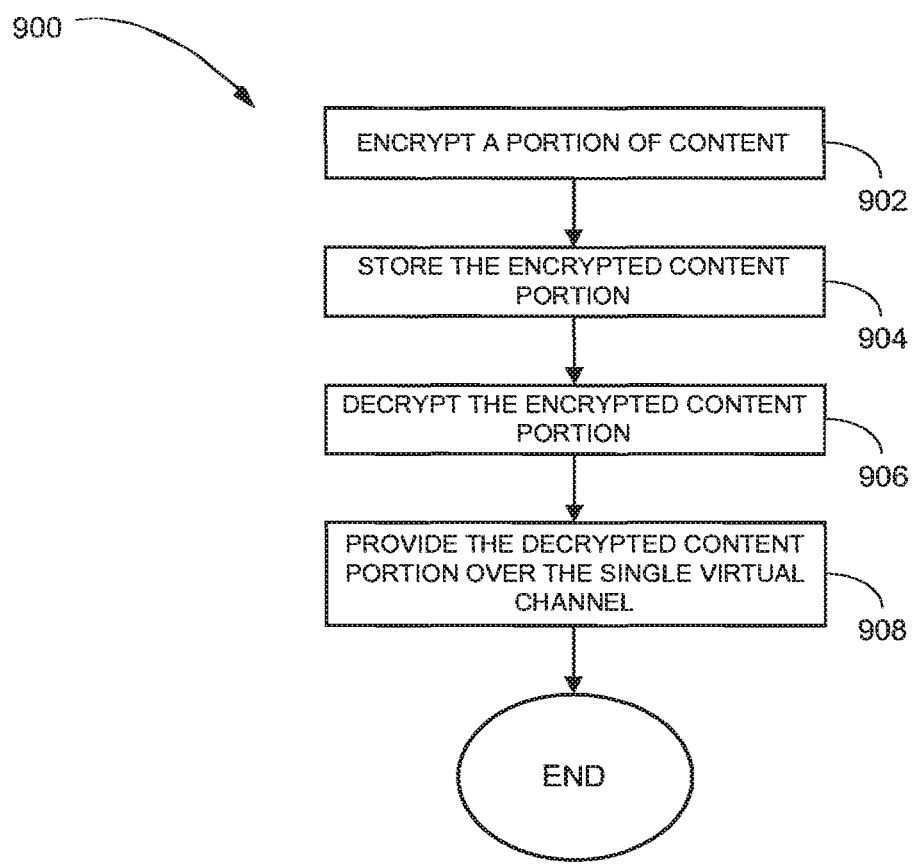

FIG. 9 illustrates a method 900 for providing content over a single virtual channel according to an example embodiment. The method 900 may be performed at block 414 (see FIG. 4) or otherwise performed.

A received portion of the content is encrypted at block 902. The encrypted content portion may include a viewing restriction until a designated time. The encrypted content portion is stored at block 904. At block 906, the encrypted content portion is decrypted in accordance with the designated time. The decrypted content portion is provided over the single virtual channel in accordance with the virtual programming data at block 908.

In an example embodiment, the method 900 may enable content to be provided to the display device 106.1 and/or the receiver device 108 prior to broadcast start time. Providing content in advance of broadcast start time may reduce network congestion during peak periods.

Figure 10:
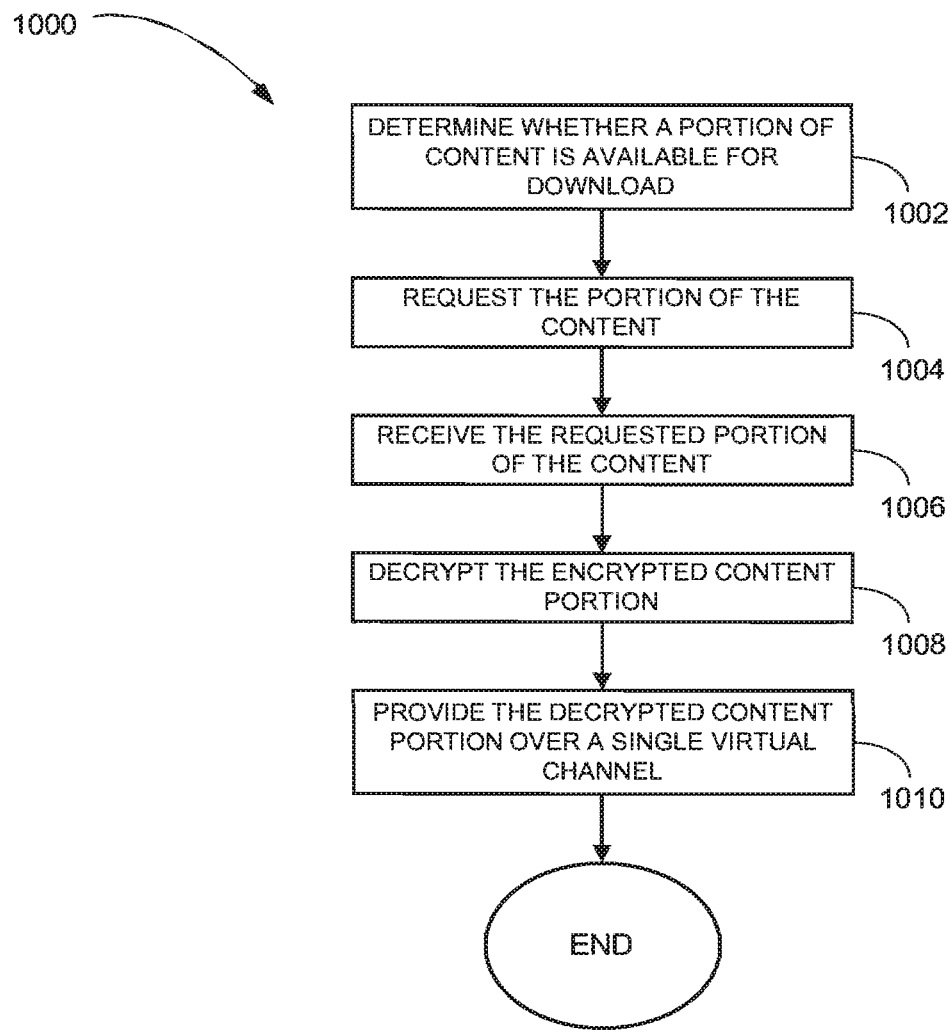

FIG. 10 illustrates a method 1000 for providing content over a single virtual channel according to an example embodiment. The method 1000 may be performed at block 414 (see FIG. 4) or otherwise performed.

At block 1002, a determination of whether a portion of the content is available for download from a selected content source of the content sources 112 is made. Based on the determination, the portion of content is requested at block 1004.

The requested portion of the content is received from the selected content source at block 1006. The requested portion of the content may be an encrypted content portion including a viewing restriction until a designated time.

The encrypted content portion is decrypted in accordance with the designated time at block 1008. At block 1010, the decrypted content portion is provided over the single virtual channel in accordance with the virtual programming data.

Figure 11:
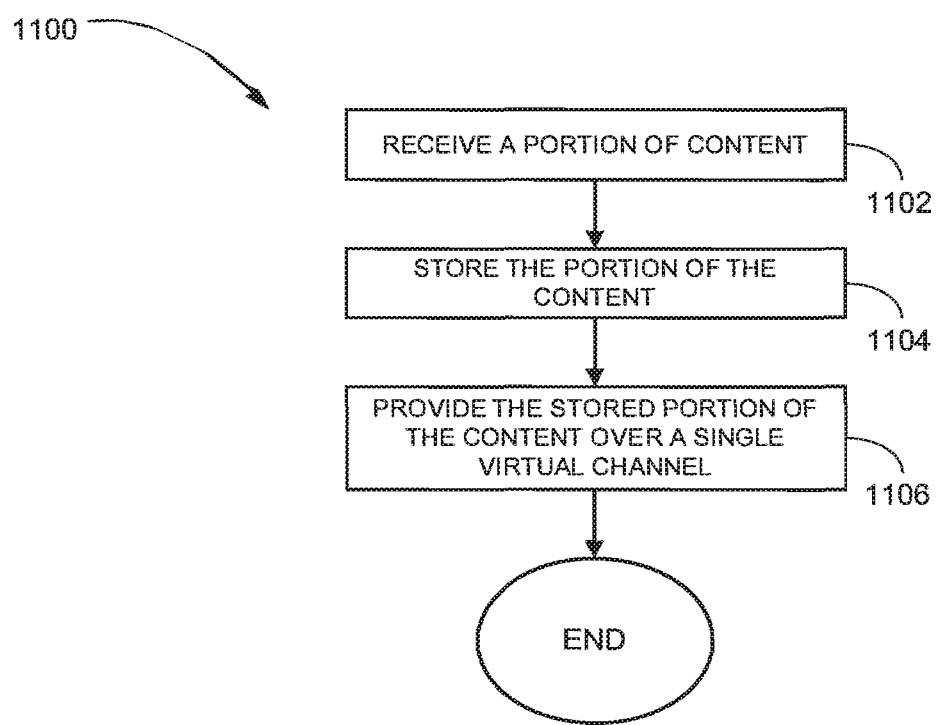

FIG. 11 illustrates a method 1100 for providing content over a single virtual channel according to an example embodiment. The method 1100 may be performed at block 414 (see FIG. 4) or otherwise performed.

At block 1102, a portion of the content is received from the content sources 112. The portion of the content is stored at block 1104. The stored portion of the content is provided over the single virtual channel in accordance with the virtual programming data at block 1106.

In an example embodiment, the method 1100 may enable content to be provided to the display device 106.1 and/or the receiver device 108 prior to broadcast start time. Providing content in advance of broadcast start time may reduce network congestion during peak periods.

Figure 12:
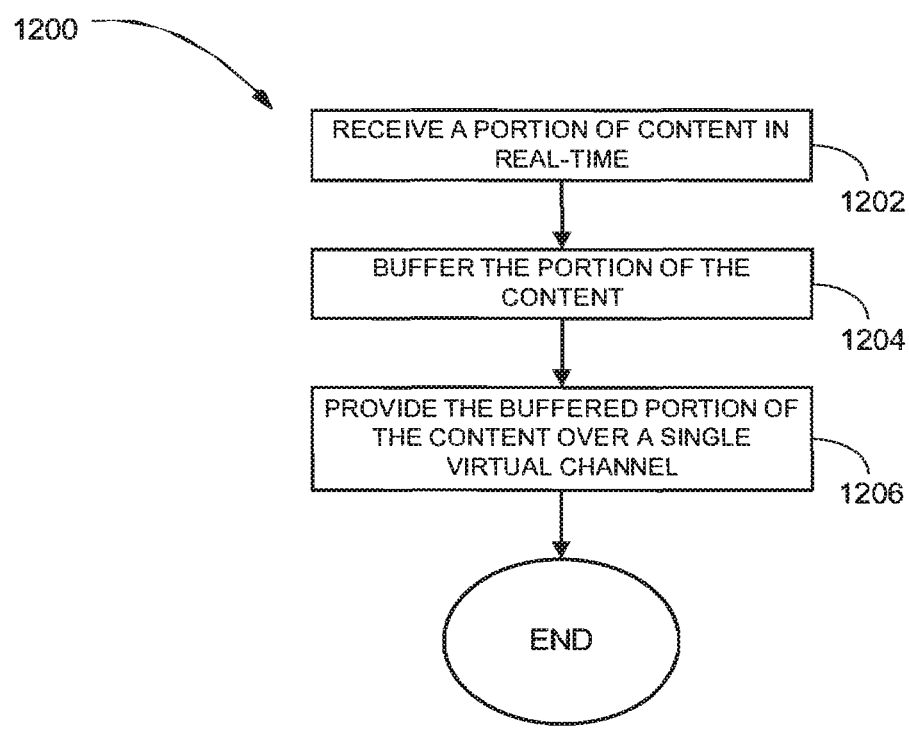

FIG. 12 illustrates a method 1200 for providing content over a single virtual channel according to an example embodiment. The method 1200 may be performed at block 414 (see FIG. 4) or otherwise performed.

A partial or entire portion of the content is received in real-time from the content sources 112 at block 1202. At block 1204, the portion of the content received in-real time may be buffered. For example, the content may be buffered in a digital video record (DVR) associated with the display device 106.1. and/or the receiver device 108.

The received portion (e.g., the buffered portion) of the content is provided over the single virtual channel in accordance with the virtual programming data at block 1206.

Figure 13:
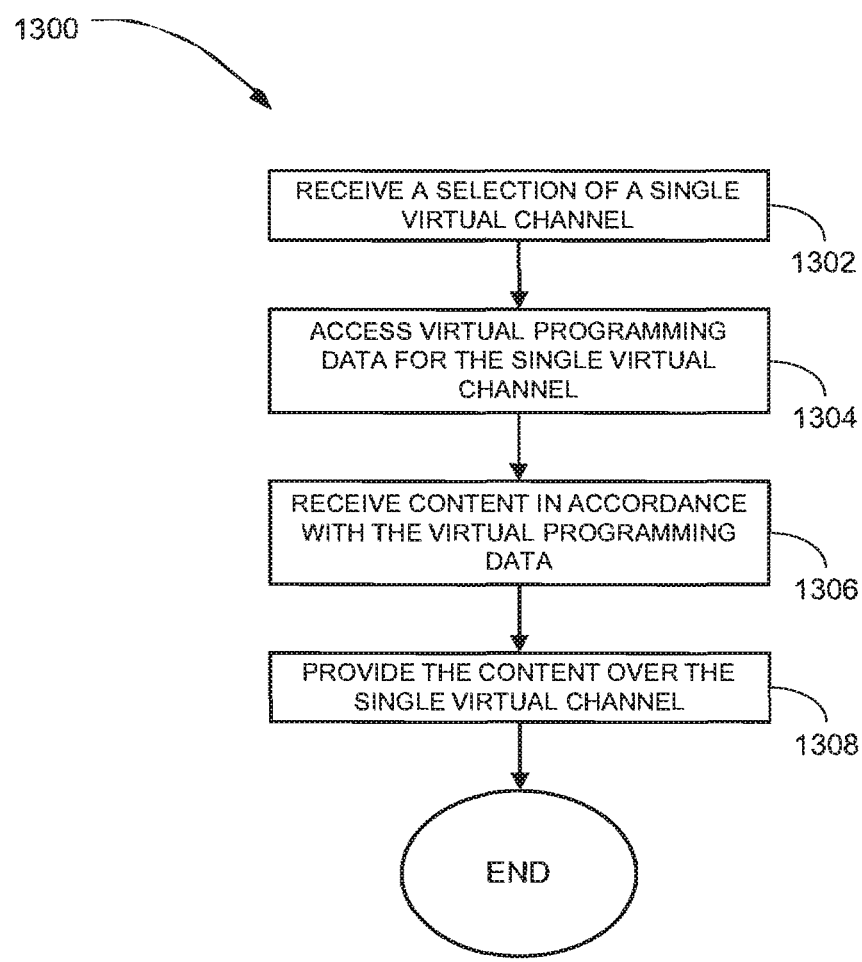
FIGS. 13 and 14 are flowcharts illustrating a method for utilizing a virtual channel in accordance with an example embodiment.

FIG. 13 illustrates a method 1300 for utilizing a virtual channel according to an example embodiment. The method 1200 may be performed by the content controller 110 in the content system 100 and/or in another system.

A selection of a single virtual channel is received from the user (e.g., through the remote control) at block 1302. The selection may be received on an EPG, from a user interface (e.g., on a web page) or otherwise received.

In an example embodiment, the virtual programming data for the single virtual channel may be received from the provider 102 and/or accessed from the display device 106.1 and/or the receiver device 108 prior to the selection of a single virtual channel from the user.

The virtual programming data is accessed for the single virtual channel at block 1304. The virtual programming data may define the content to be provided over the single virtual channel. The virtual programming data for the single virtual channel may be received from the provider 102 and/or the virtual programming data may be accessed from storage on the display device 106.1 and/or the receiver device 108.

The content or a portion thereof may be received over the provider network in accordance with the virtual programming data at block 1306. The content is provided over the single virtual channel in accordance with the virtual programming data at block 1308.

Figure 14:
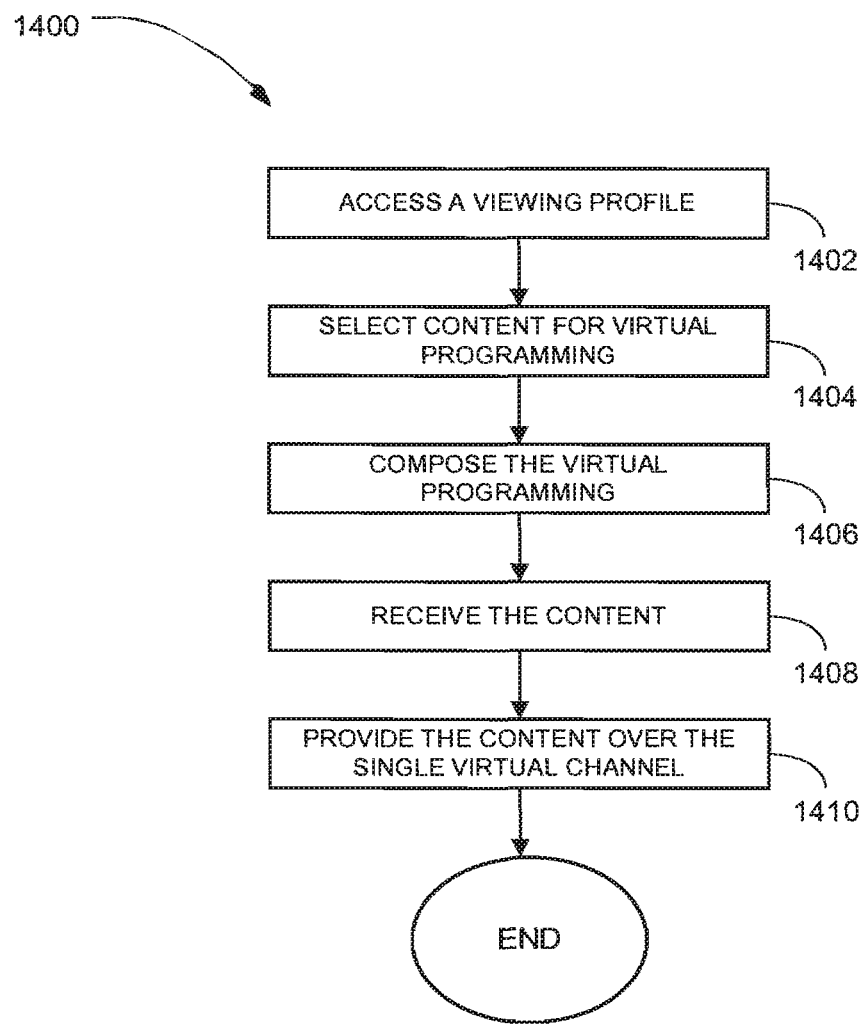

FIG. 14 illustrates a method 1400 for utilizing a virtual channel according to an example embodiment. The method 1400 may be performed by the content controller 110 in the content system 100 and/or in another system.

A viewing profile is accessed at block 1402. The viewing profile may include identification of programs set to record, programs set for download, previously recorded programs, stored programs, and/or favorite channels. Identification of other program designations may also be used.

The viewing profile, by way of example, may be created prior to access based on tracking of prior content received from the plurality of content sources. The viewing profile may, in an example embodiment be created by accessing a record of favorite programming content and creating the viewing profile based on the record of favorite programming content.

Content is selected for virtual programming in accordance with the viewing profile from available programming of the one or more content sources 112 at block 1404.

The content may be selected by accessing a content selection criterion and selecting content from the content sources 112 in accordance with the viewing profile and the content selection criterion. The content selection criterion may include, by way of example, a rating of the content, a person involved with the content, and/or an originator of the content. Other content selection criterion may also be used.

At block 1406, the virtual programming data is automatically composed for a single virtual channel from the selection of the content in accordance with the viewing profile. The content may be received from the content sources 112 over the provider network 104 (e.g., an IP network) at block 1408. The content is provided over the single channel in accordance with the selected virtual programming at block 1410.

Figure 15:
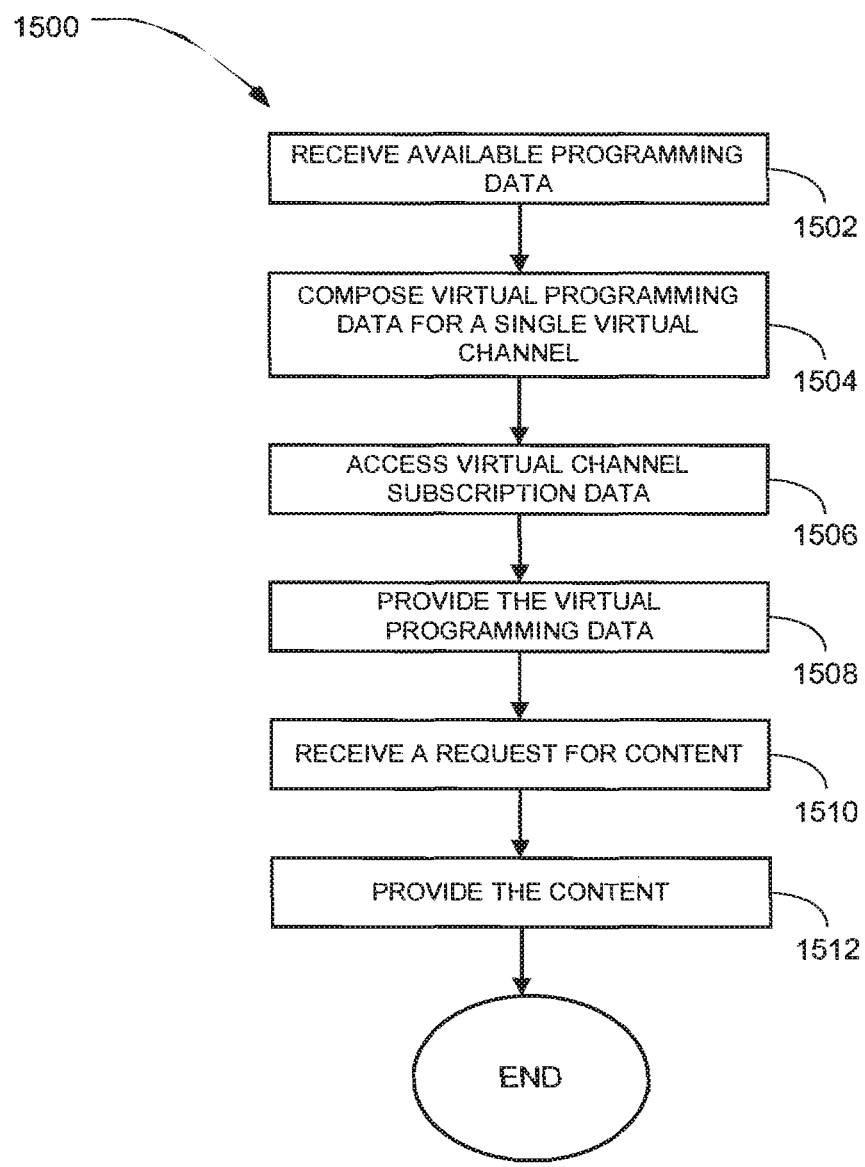
FIG. 15 is a flowchart illustrating a method for data distribution in accordance with an example embodiment.

FIG. 15 illustrates a method 1500 for data distribution according to an example embodiment. The method 1500 may be performed by the distribution subsystem 114 in the content system 100 and/or in another system.

Available programming data may be received from one or more of the content sources 112 at block 1502. At block 1504, virtual programming data may be composed for a single virtual channel from the available programming data of the content sources 112.

Virtual channel subscription data may be accessed for the virtual programming data at block 1506. The virtual channel subscription data may including identification of one or more receiver devices 108 and/or display devices 106.1.

At block 1508, the virtual programming data may be provided to the one or more receiver devices 108 and/or display devices 106.1 identified on the virtual channel subscription data.

A request for content from the content sources 112 in accordance with the virtual programming data may be received at block 1510. The content may be provided in response to the request at block 1512.

Figure 16:
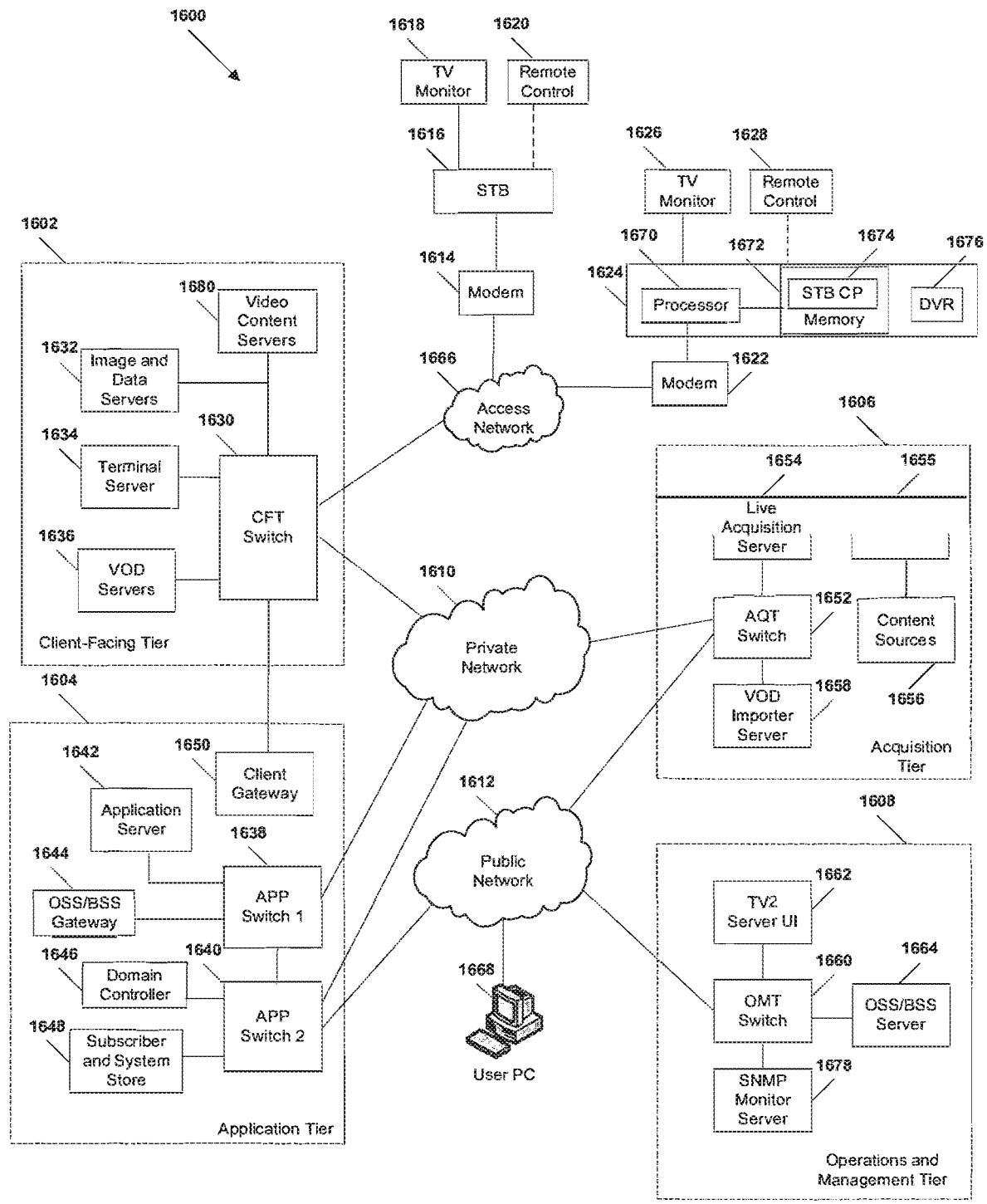
FIG. 16 is a block diagram of an IPTV system in which the content system of FIG. 1 may be deployed in accordance with an example embodiment.

FIG. 16 illustrates an example embodiment of an Internet Protocol Television (IPTV) system 1600 in which the content system 100 may be deployed. However, the content systems 100 may be deployed in other types of IPTV and non-IPTV video systems.

The system 1600 as illustrated may include a client facing tier 1602, an application tier 1604, an acquisition tier 1606, and an operations and management tier 1608. Each tier 1602, 1604, 1606, 1608 is coupled to a private network 1610; to a public network 1612, such as the Internet; or to both the private network 1610 and the public network 1612. For example, the client-facing tier 1602 may be coupled to the private network 1610. Further, the application tier 1604 may be coupled to the private network 1610 and to the public network 1612. The acquisition tier 1606 may also be coupled to the private network 1610 and to the public network 1612. Additionally, the operations and management tier 1608 may be coupled to the public network 1612.

As illustrated in FIG. 16, the various tiers 1602, 1604, 1606, 1608 communicate with each other via the private network 1610 and the public network 1612. For instance, the client-facing tier 1602 may communicate with the application tier 1604 and the acquisition tier 1606 via the private network 1610. The application tier 1604 may also communicate with the acquisition tier 1606 via the private network 1610. Further, the application tier 1604 may communicate with the acquisition tier 1606 and the operations and management tier 1608 via the public network 1612. Moreover, the acquisition tier 1606 may communicate with the operations and management tier 1608 via the public network 1612. In a particular embodiment, elements of the application tier 1604, including, but not limited to, a client gateway 1650, may communicate directly with the client-facing tier 1602.

As illustrated in FIG. 16, the client-facing tier 1602 may communicate with user equipment via a private access network 1666 (e.g., the provider network 104 of FIG. 1), such as an Internet Protocol Television (IPTV) access network. In an illustrative embodiment, modems, such as a first modem 1614 and a second modem 1622 may be coupled to the private access network 1666. The client-facing tier 1602 may communicate with a first representative set-top box device 1616 via the first modem 1614 and with a second representative set-top box device 1624 via the second modem 1622. The client-facing tier 1602 may communicate with a large number of set-top boxes, such as the representative set-top boxes 1616, 1624, (e.g., the receiver device 108 of FIG. 1) over a wide geographic area, such as a regional area, a metropolitan area, a viewing area, a designated market area or any other suitable geographic area, market area, or subscriber or customer group that may be supported by networking the client-facing tier 1602 to numerous set-top box devices. In an illustrative embodiment, the client-facing tier, or any portion thereof, may be included at a video head-end office.

In a particular embodiment, the client-facing tier 1602 may be coupled to the modems 1614, 1622 via fiber optic cables. Alternatively, the modems 1614 and 1622 may be digital subscriber line (DSL) modems that are coupled to one or more network nodes via twisted pairs, and the client-facing tier 1602 may be coupled to the network nodes via fiber-optic cables. Each set-top box device 1616, 1624 may process data received via the private access network 1666, via an IPTV software platform, such as Microsoft® TV IPTV Edition. In another embodiment, representative set-top boxes 1616, 1624 may receive data from private access network 1666 through RF and other cable and/or satellite based networks.

Additionally, the first set-top box device 1616 may be coupled to a first external display device, such as a first television monitor 1618, and the second set-top box device 1624 may be coupled to a second external display device, such as a second television monitor 1626 (e.g., the display device 106.1, 106.2, of FIG. 1). Moreover, the first set-top box device 1616 may communicate with a first remote control 1620, and the second set-top box device may communicate with a second remote control 1628.

In an example, non-limiting embodiment, each set-top box device 1616, 1624 may receive video content, which may include video and audio portions, from the client-facing tier 1602 via the private access network 1666. The set-top boxes 1616, 1624 may transmit the video content to an external display device, such as the television monitors 1618, 1626. Further, the set-top box devices 1616, 1624 may each include a STB processor, such as STB processor 1670, and a STB memory device, such as STB memory 1672, which is accessible to the STB processor 1670. In one embodiment, a computer program, such as the STB computer program 1674, may be embedded within the STB memory device 1672. Each set-top box device 1616, 1624 may also include a video content storage module, such as a digital video recorder (DVR) 1676. In a particular embodiment, the set-top box devices 1616, 1624 may communicate commands received from the remote control devices 1620, 1628 to the client-facing tier 1602 via the private access network 1666.

In an illustrative embodiment, the client-facing tier 1602 may include a client-facing tier (CFT) switch 1630 that manages communication between the client-facing tier 1602 and the private access network 1666 and between the client-facing tier 1602 and the private network 1610. As shown, the CFT switch 1630 is coupled to one or more image and data servers 1632 that store still images associated with programs of various IPTV channels. The image and data servers 1632 may also store data related to various channels, e.g., types of data related to the channels and to programs or video content displayed via the channels. In an illustrative embodiment, the image and data servers 1632 may be a cluster of servers, each of which may store still images, channel and program-related data, or any combination thereof. The CFT switch 1630 may also be coupled to a terminal server 1634 that provides terminal devices with a connection point to the private network 1610. In a particular embodiment, the CFT switch 1630 may also be coupled to one or more video-on-demand (VOD) servers 1636 that store or provide VOD content imported by the IPTV system 1600. In an illustrative, non-limiting embodiment, the VOD content servers 1680 may include one or more unicast servers.

The client-facing tier 1602 may also include one or more video content servers 1680 that transmit video content requested by viewers via their set-top boxes 1616, 1624. In an illustrative, non-limiting embodiment, the video content servers 1680 may include one or more multicast servers.

As illustrated in FIG. 16, the application tier 1604 may communicate with both the private network 1610 and the public network 1612. The application tier 1604 may include a first application tier (APP) switch 1638 and a second APP switch 1640. In a particular embodiment, the first APP switch 1638 may be coupled to the second APP switch 1640.

The first APP switch 1638 may be coupled to an application server 1642 and to an OSS/BSS gateway 1644. In a particular embodiment, the application server 1642 may provide applications to the set-top box devices 1616, 1624 via the private access network 1666, which enable the set-top box devices 1616, 1624 to provide functions, such as display, messaging, processing of IPTV data and VOD material, etc. In a particular embodiment, the OSS/BSS gateway 1644 includes operation systems and support (OSS) data, as well as billing systems and support (BSS) data. In one embodiment, the OSS/BSS gateway may provide or restrict access to an OSS/BSS server 1664 that stores operations and billing systems data.

Further, the second APP switch 1640 may be coupled to a domain controller 1646 that provides web access, for example, to users via the public network 1612. For example, the domain controller 1646 may provide remote web access to IPTV account information via the public network 1612, which users may access using their personal computers 1668. The second APP switch 1640 may be coupled to a subscriber and system store 1648 that includes account information, such as account information that is associated with users who access the system 1600 via the private network 1610 or the public network 1612. In a particular embodiment, the application tier 1604 may also include a client gateway 1650 that communicates data directly with the client-facing tier 1602. In this embodiment, the client gateway 1650 may be coupled directly to the CFT switch 1630. The client gateway 1650 may provide user access to the private network 1610 and the tiers coupled thereto.

In a particular embodiment, the set-top box devices 1616, 1624 may access the IPTV system 1600 via the private access network 1666, using information received from the client gateway 1650. In this embodiment, the private access network 1666 may provide security for the private network 1610. User devices may access the client gateway 1650 via the private access network 1666, and the client gateway 1650 may allow such devices to access the private network 1610 once the devices are authenticated or verified. Similarly, the client gateway 1650 may prevent unauthorized devices, such as hacker computers or stolen set-top box devices from accessing the private network 1610, by denying access to these devices beyond the private access network 1666.

For example, when the first representative set-top box device 1616 accesses the system 1600 via the private access network 1666, the client gateway 1650 may verify subscriber information by communicating with the subscriber and system store 1648 via the private network 1610, the first APP switch 1638, and the second APP switch 1640. Further, the client gateway 1650 may verify billing information and status by communicating with the OSS/BSS gateway 1644 via the private network 1610 and the first APP switch 1638. In one embodiment, the OSS/BSS gateway 1644 may transmit a query across the first APP switch 1638, to the second APP switch 1640, and the second APP switch 1640 may communicate the query across the public network 1612 to the OSS/BSS server 1664. After the client gateway 1650 confirms subscriber and/or billing information, the client gateway 1650 may allow the set-top box device 1616 access to IPTV content and VOD content. If the client gateway 1650 is unable to verify subscriber information for the set-top box device 1616, e.g., because it is connected to an unauthorized twisted pair, the client gateway 1650 may block transmissions to and from the set-top box device 1616 beyond the private access network 1666.

As indicated in FIG. 16, the acquisition tier 1606 includes an acquisition tier (AQT) switch 1652 that communicates with the private network 1610. The AQT switch 1652 may also communicate with the operations and management tier 1608 via the public network 1612. In a particular embodiment, the AQT switch 1652 may be coupled to a live acquisition server 1654 that receives television or movie content, for example, from content sources 1656 through an encoder 1655. In a particular embodiment during operation of the IPTV system, the live acquisition server 1654 may acquire television or movie content. The live acquisition server 1654 may transmit the television or movie content to the AQT switch 1652 and the AQT switch 1652 may transmit the television or movie content to the CFT switch 1630 via the private network 1610.

Further, the television or movie content may be transmitted to the video content servers 1680, where it may be encoded, formatted, stored, or otherwise manipulated and prepared for communication to the set-top box devices 1616, 1624. The CFT switch 1630 may communicate the television or movie content to the modems 1614, 1622 via the private access network 1666. The set-top box devices 1616, 1624 may receive the television or movie content via the modems 1614, 1622, and may transmit the television or movie content to the television monitors 1618, 1626. In an illustrative embodiment, video or audio portions of the television or movie content may be streamed to the set-top box devices 1616, 1624.

Further, the AQT switch may be coupled to a video-on-demand importer server 1658 that stores television or movie content received at the acquisition tier 1606 and communicates the stored content to the VOD server 1636 at the client-facing tier 1602 via the private network 1610. Additionally, at the acquisition tier 1606, the video-on-demand (VOD) importer server 1658 may receive content from one or more VOD sources outside the IPTV system 1600, such as movie studios and programmers of non-live content. The VOD importer server 1658 may transmit the VOD content to the AQT switch 1652, and the AQT switch 1652, in turn, may communicate the material to the CFT switch 1630 via the private network 1610. The VOD content may be stored at one or more servers, such as the VOD server 1636.

When user issue requests for VOD content via the set-top box devices 1616, 1624, the requests may be transmitted over the private access network 1666 to the VOD server 1636, via the CFT switch 1630. Upon receiving such requests, the VOD server 1636 may retrieve the requested VOD content and transmit the content to the set-top box devices 1616, 1624 across the private access network 1666, via the CFT switch 1630. The set-top box devices 1616, 1624 may transmit the VOD content to the television monitors 1618, 1626. In an illustrative embodiment, video or audio portions of VOD content may be streamed to the set-top box devices 1616, 1624.

FIG. 16 further illustrates that the operations and management tier 1608 may include an operations and management tier (OMT) switch 1660 that conducts communication between the operations and management tier 1608 and the public network 1612. In the embodiment illustrated by FIG. 16, the OMT switch 1660 is coupled to a TV2 server 1662. Additionally, the OMT switch 1660 may be coupled to an OSS/BSS server 1664 and to a simple network management protocol (SNMP) monitor 1678 that monitors network devices within or coupled to the IPTV system 1600. In a particular embodiment, the OMT switch 1660 may communicate with the AQT switch 1652 via the public network 1612.

In an illustrative embodiment, the live acquisition server 1654 may transmit the television or movie content to the AQT switch 1652, and the AQT switch 1652, in turn, may transmit the television or movie content to the OMT switch 1660 via the public network 1612. In this embodiment, the OMT switch 1660 may transmit the television or movie content to the TV2 server 1662 for display to users accessing the user interface at the TV2 server 1662. For example, a user may access the TV2 server 1662 using a personal computer (PC) 1668 coupled to the public network 1612.

Figure 17:
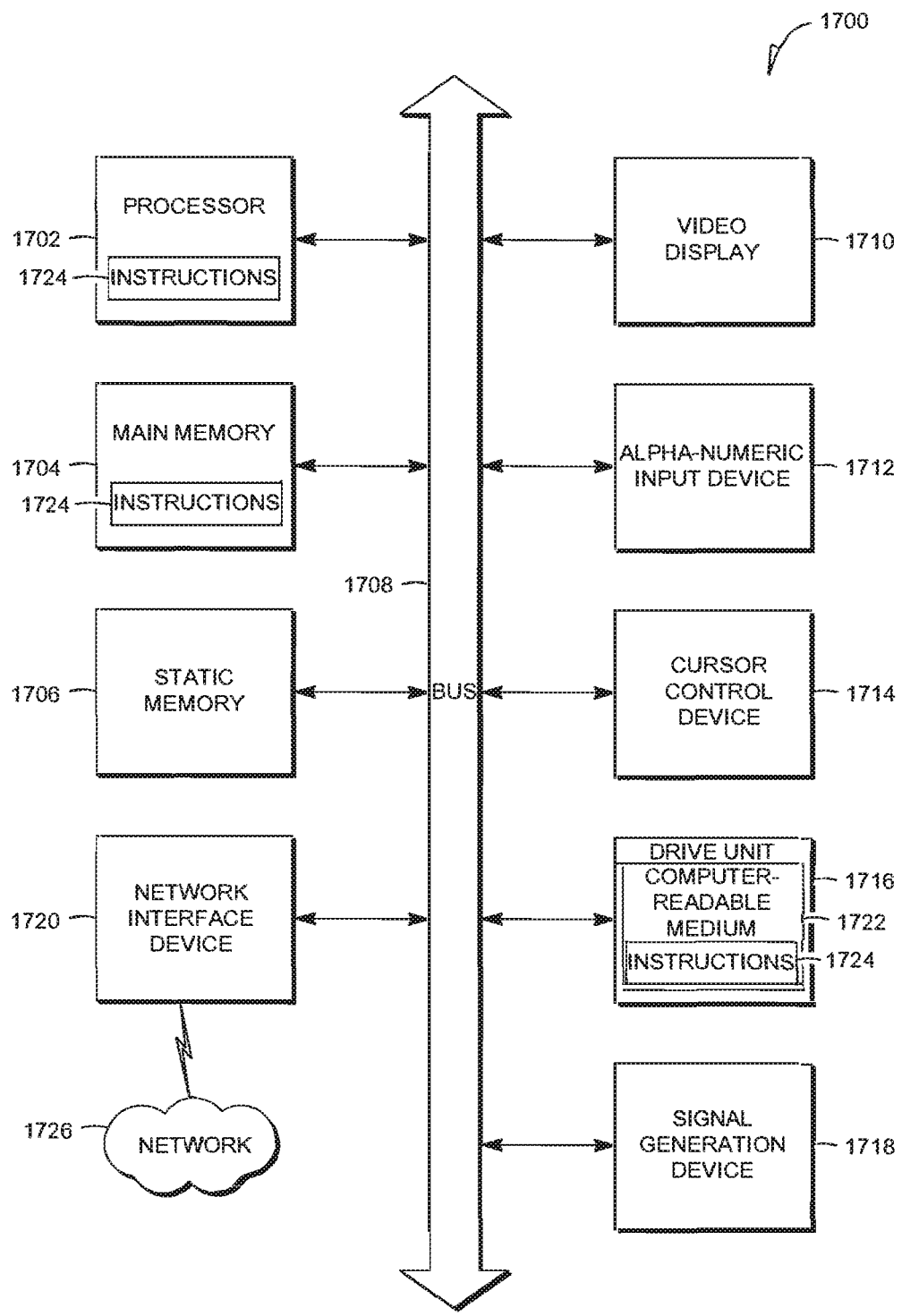
FIG. 17 illustrates a diagrammatic representation of machine in the example form of a computer system within which a set of instructions for causing the machine to perform any one or more of the methodologies discussed herein may be executed.

FIG. 17 shows a diagrammatic representation of machine in the example form of a computer system 1700 within which a set of instructions may be executed causing the machine to perform any one or more of the methods, processes, operations, or methodologies discussed herein. The provider 102, the receiver device 108, and/or the display device 106.1, 106.2 (see FIG. 1) may include the functionality of the computer system 1700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU) a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a drive unit 1716, a signal generation device 1718 (e.g., a speaker) and a network interface device 1720.

The drive unit 1716 includes a machine-readable medium 1722 on which is stored one or more sets of instructions (e.g., software 1724) embodying any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present invention. The term "machine-readable medium" shall accordingly be taken to include, but not be limited to, solid-state memories, optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for providing content have been described.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   selecting, by a processing system including a processor, content from a plurality of content sources according to a viewing profile, resulting in selected content;
   associating, by the processing system, the selected content with a first virtual channel in accordance with the viewing profile;
   determining, by the processing system, whether a first portion of the selected content is available for presentation at a first display device of a premises prior to a first broadcast start time; and
   providing, by the processing system to the first display device, the first portion of the selected content over the first virtual channel prior to the first broadcast start time, wherein the first display device encrypts the first portion of the selected content until the first broadcast start time.

2. The method of claim 1, wherein the viewing profile comprises a history of previously viewed content.

3. The method of claim 1, wherein the selecting comprises:
   accessing a content selection criterion; and selecting the content from the plurality of content sources in accordance with the viewing profile and the content selection criterion.

4. The method of claim 3, wherein the content selection criterion includes a rating of the content, an individual presented in the content, an originator of the content, or a combination thereof.

5. The method of claim 1, comprising associating a second portion of the selected content with a second virtual channel for presentation at a second display device in the premises, and providing the second portion of the selected content prior to a second broadcast start time.

6. The method of claim 1, further comprising receiving, by the processing system, the first portion of the selected content in real-time, and wherein the providing further comprises providing the first portion of the selected content in real-time over the first virtual channel.

7. The method of claim 6, wherein the providing of the first portion of the selected content further comprises:
buffering the first portion of the selected content received in real-time, resulting in a buffered portion; and
providing the buffered portion over the first virtual channel.

8. The method of claim 1, wherein the first display device is a mobile telephone.

9. A non-transitory, machine-readable medium, comprising executable instructions that, when executed by a processing system including a processor, facilitate performance of operations, the operations comprising:
selecting, by the processing system, content from a plurality of content sources according to a user profile, resulting in selected content;
associating, by the processing system, the selected content with a first virtual channel in accordance with the user profile;
determining, by the processing system, whether a first portion of the selected content is available for presentation at a first display device of a premises prior to a first broadcast start time; and
providing, by the processing system to the first display device, the first portion of the selected content over the first virtual channel prior to the first broadcast start time, wherein the first portion of the selected content is encrypted by the first display device until the first broadcast start time.

10. The non-transitory, machine-readable medium of claim 9, wherein the user profile comprises a history of previously viewed content.

11. The non-transitory, machine-readable medium of claim 9, wherein the selecting comprises:
accessing a content selection criterion; and
selecting the content from the plurality of content sources in accordance with the user profile and the content selection criterion.

12. The non-transitory, machine-readable medium of claim 11, wherein the content selection criterion includes a rating of the content, an individual presented in the content, an originator of the content, or a combination thereof.

13. The non-transitory, machine-readable medium of claim 9, comprising associating a second portion of the selected content with a second virtual channel for presentation at a second display device in the premises, and providing the second portion of the selected content prior to a second broadcast start time.

14. The non-transitory, machine-readable medium of claim 9, further comprising receiving, by the processing system, the first portion of the selected content in real-time, and wherein the providing further comprises providing the first portion of the selected content in real-time over the first virtual channel.

15. The non-transitory, machine-readable medium of claim 14, wherein the providing of the first portion of the selected content further comprises:
buffering the first portion of the selected content received in real-time, resulting in a buffered portion; and
providing the buffered portion over the first virtual channel.

16. The non-transitory, machine-readable medium of claim 9, wherein the first display device is a mobile telephone.

17. A device, comprising:
a processing system including a processor; and
a memory storing executable instructions that, when executed by the processing system, perform operations comprising:
selecting content from a plurality of content sources according to a viewing profile, resulting in selected content;
associating the selected content with a first virtual channel in accordance with the viewing profile;
determining whether a first portion of the selected content is available for presentation at a first display device of a premises prior to a first broadcast start time; and
providing, to the first display device, the first portion of the selected content over the first virtual channel prior to the first broadcast start time, wherein the first portion of the selected content is encrypted by the first display device until the first broadcast start time.

18. The device of claim 17, wherein the viewing profile comprises a history of previously viewed content.

19. The device of claim 17, wherein the selecting comprises:
accessing a content selection criterion; and
selecting the content from the plurality of content sources in accordance with the viewing profile and the content selection criterion.

20. The device of claim 19, wherein the content selection criterion includes a rating of the content, an individual presented in the content, an originator of the content, or a combination thereof.

* * * * *